United States Patent [19]

Saito

[11] 4,428,014

[45] Jan. 24, 1984

[54] CASE FOR A ROTARY RECORDING MEDIUM

[75] Inventor: Takashi Saito, Ayase, Japan

[73] Assignee: Victor Company of Japan, Ltd., Yokohama, Japan

[21] Appl. No.: 300,671

[22] Filed: Sep. 9, 1981

[30] Foreign Application Priority Data

Sep. 9, 1980 [JP] Japan .................................. 55-125109

[51] Int. Cl.³ .............................................. G11B 23/02
[52] U.S. Cl. .................................... 360/133; 206/309
[58] Field of Search ....................... 360/133, 132, 135; 369/77; 206/309

[56] References Cited

U.S. PATENT DOCUMENTS

| 3,662,360 | 5/1972 | Lambert | 360/133 |
| 4,113,262 | 9/1978 | DeStephanis | 360/97 X |
| 4,138,703 | 2/1979 | Stave et al. | 360/133 |
| 4,266,784 | 5/1981 | Torrington | 360/133 X |
| 4,316,539 | 2/1982 | Torrington | 360/133 X |

FOREIGN PATENT DOCUMENTS

| 2406179 | 8/1974 | Fed. Rep. of Germany | 360/133 |
| 2915696 | 10/1979 | Fed. Rep. of Germany | 360/133 |
| 3103014 | 2/1982 | Fed. Rep. of Germany | 360/133 |
| 2373122 | 6/1978 | France | 360/133 |
| 2374721 | 7/1978 | France | 360/133 |
| 55-52561 | 4/1980 | Japan | 360/133 |
| 1460331 | 1/1977 | United Kingdom | 360/133 |
| 2029076A | 3/1980 | United Kingdom | 360/133 |
| 2047942 | 12/1980 | United Kingdom | 360/133 |
| 1596624 | 8/1981 | United Kingdom | 360/133 |

Primary Examiner—Aristotelis M. Psitos
Assistant Examiner—K. Wong
Attorney, Agent, or Firm—Louis Bernat

[57] ABSTRACT

A case for a rotary recording medium comprises a jacket having a space for accommodating a rotary recording medium and an elongated opening on one end side of the jacket through which the rotary recording medium can enter and leave the jacket, and a lid member for closing the opening of the jacket. The jacket has projecting parts at the opening, at positions crossing the opening.

8 Claims, 5 Drawing Figures

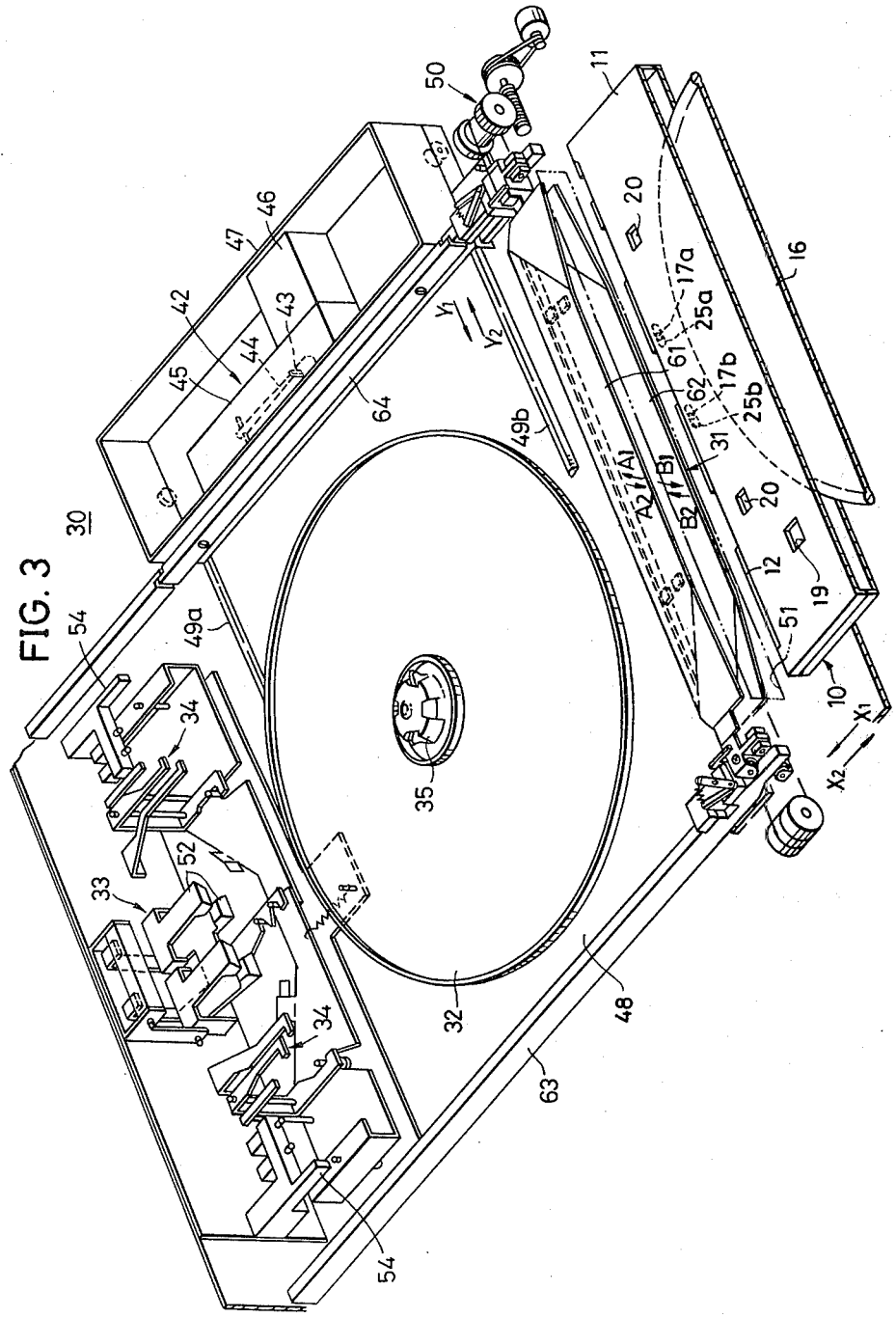

CASE FOR A ROTARY RECORDING MEDIUM

BACKGROUND OF THE INVENTION

The present invention generally relates to cases for rotary recording mediums, and more particularly to a case which comprises a jacket for accommodating the rotary recording medium and a lid member for closing an opening of the jacket. Further, the lid has parts projecting within the opening of the jacket in the vicinity of its opening so that the rotary recording medium is prevented from falling outside the jacket if the rotary recording medium is not properly held within a reproducing apparatus.

Generally, a rotary recording medium (hereinafter simply referred to as a "disc") in which an information signal such as a video signal and an audio signal is recorded with high density, is accommodated within a disc case to prevent the surface of the disc from collecting dirt and dust particles, and to protect the disc from being damaged. In the above type of a disc case, the case is left at a predetermined position within a reproducing apparatus by an operation in which a case with a disc therein is inserted into and then pulled out from the reproducing apparatus. Further, the disc is recovered from the reproducing apparatus and put into the disc case, by an operation from outside the reproducing apparatus in which an empty disc case is inserted into and then pulled out from the reproducing apparatus.

Conventionally, a disc case of the above described type was described in a U.S. Patent application Ser. No. 229,303 entitled "Case for a Disc-Shaped Recording Medium" filed on Jan. 28, 1981 in which the assignee is the same as that of the present application. This previously described disc case comprises a jacket having an opening through which a disc can enter and leave the jacket, and a lid member inserted through the opening of the jacket for closing the opening of the jacket.

In the above described disc case, no projections are provided in the opening of the jacket. The disc is not damaged when passing through the opening of the jacket. On the other hand, the lid member is locked when the disc is loaded into the reproducing apparatus. However, on rare occasions, the disc is not held. In this case, where the disc is not properly held, the disc is pulled outside the reproducing apparatus together with the jacket, in a state where the disc is accommodated within the jacket from which the lid member is separated. Therefore, when the jacket is held with the opening of the jacket facing down, the disc easily falls from within the jacket. Accordingly, there was a disadvantage in that the recording surface of the disc was easily contaminated by dirt and dust particles, and was damaged.

SUMMARY OF THE INVENTION

Accordingly, it is a general object of the present invention to provide a novel and useful case for a rotary recording medium, in which the above described disadvantages have been overcome.

Another and more specific object of the present invention is to provide a case for a rotary recording medium, the case having projecting parts projecting within an opening of a jacket of the case. According to the case of the present invention, if a rotary recording medium is not properly held and is thus pulled outside a reproducing apparatus together with the jacket, the rotary recording medium is locked by the projecting parts and prevented from slipping out the jacket, in order to protect the rotary recording medium from becoming damaged.

Other objects and further features of the present invention will be apparent from the following detailed description when read in conjunction with the accompanying drawings.

BRIEF DESCRIPTION OF THE DRAWINGS

FIG. 3 is a perspective view, with a part cut away, showing an example of a rotary recording medium reproducing apparatus with an upper lid disassembled.

DETAILED DESCRIPTION

Figure 1:
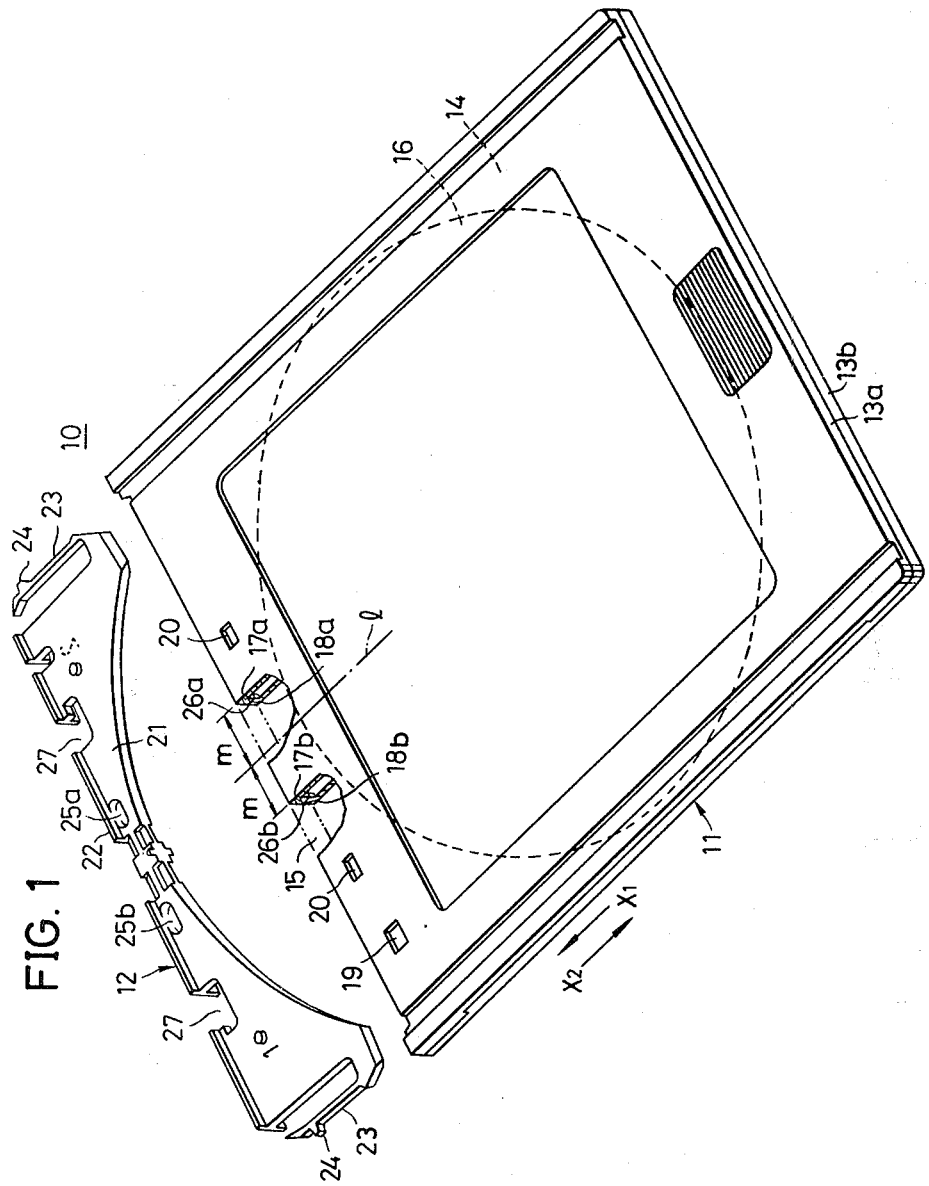
FIG. 1 is a perspective view, with a part cut away and disassembled, showing an embodiment of a case for a rotary recording medium, according to the present invention.
Figure 2:
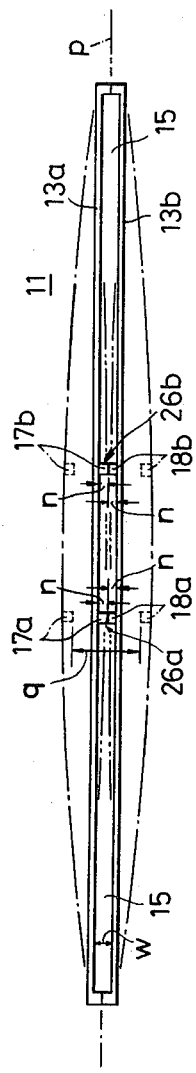
FIG. 2 is a diagram of a jacket shown in FIG. 1 and viewed from the side of an opening of the jacket.

FIGS. 1 and 2 show an embodiment of a case for a rotary recording medium, according to the present invention. In FIGS. 1 and 2, a disc case 10 comprises a jacket 11 and a lid plate 12.

The jacket 11 is assembled from a pair of jacket halves 13a and 13b, and comprises a flat cavity or space 14 therein. This space 14 is open at an opening 15 at the front side of the jacket 11, and is closed on the other three sides, to accommodate a disc 16. The disc 16 enters and leaves the jacket 11 through the opening 15 as will be described hereinafter.

Pairs of columnar projecting parts 17a and 17b, and 18a and 18b (which form the essential part of the present invention), are formed on the jacket halves 13a and 13b, at the opening 15 of the jacket 11. Furthermore, in the vicinity of the opening 15, a display window 19 and a pair of engaging windows 20 and 20 are respectively formed in the jacket halves 13a and 13b.

The lid plate 12 comprises a plate-shaped main lid body 21 and a rim portion 22 formed unitarily at the front edge of the main lid body 21. A pair of engaging arms 23 are formed on both sides of the main lid body 21. The main lid body 21 of the lid plate 12 is inserted into a predetermined position within the jacket 11 through the opening 15. Moreover, projections 24 of the engaging arms 23 engage depressions (not shown), and thus, the lid plate 12 engages with the jacket 11. Further, a pair of elongated holes 25a and 25b are formed in the main lid body 21 on the side of the rim portion 22.

The above columnar projecting parts 17a and 17b project from the upper jacket half 13a towards the lower jacket half 13b. On the other hand, the columnar projecting parts 18a and 18b project from the lower jacket half 13b towards the upper jacket half 13a. The above columnar projecting parts 17a and 17b, and 18a and 18b are in the form of teeth at the opening 15 of the jacket 11, at symmetrical positions on the left and right sides, and separated by a distance m from a center line l of the jacket 11. A projecting length n (FIG. 2) of the above columnar projecting parts 17a and 17b, and 18a and 18b is set to one-half of a width w of the opening 15.

Accordingly, projecting end surfaces of the columnar projecting parts 17a and 18a, and 17b and 18b respectively make contact with each other, on a center line (surface) p along the thickness direction of the jacket 11. Therefore, the columnar projecting parts 17a and 18a, and 17b and 18b operate together to form stopping beams 26a and 26b for preventing the disc 16 from slipping out from the jacket 11. These stopping beams 26a and 26b form bridges across the opening 15 of the jacket 11, in the vicinity of the center portion of the opening 15.

When the lid plate 12 is engaged with the jacket 11, the above columnar projecting parts 17a and 18a enter within the elongated hole 25a while the columnar projecting parts 17b and 18b enter within the elongated hole 25b. Each of the above columnar projecing parts 17a, 17b, 18a, and 18b operate to lock the lid plate 12 onto the jacket 11.

The jacket halves 13a and 13b are made of styrol resin, and are of a suitable flexibility. Accordingly, the opening 15 can be enlarged, and when the enlarging operation is released, the opening 15 is returned from the enlarged to the original state due to the flexibility of the jacket halves 13a and 13b.

Next, the operation of the above columnar projecting parts 17a, 17b, 18a, and 18b will be described in conjunction with the loading operation in which the disc 16 is loaded into the reproducing apparatus.

FIG. 3 shows a disc reproducing apparatus 30 for reproducing the disc 16 within the above disc case 10. As shown in FIG. 3, the reproducing apparatus 30 substantially comprises a jacket opening enlarging mechanism 31, a turntable 32 for rotating the disc 16 placed thereon, a disc holding mechanism 33 for holding the disc 16, a lid plate locking mechanism 34 for locking the lid plate 12, and the like.

A reproducing transducer 42 comprises a pickup device 45 including a cantilever arm 44 having a reproducing stylus 43 at the tip end thereof, a resonator 46, and the like, and is mounted to a carriage 47. The carriage 47 is transferred in the directions of arrows Y1 and Y2 by means of a transferring mechanism 50. Rollers on the carriage 47 roll along rails 49a and 49b respectively provided on a chassis 48.

The disc holding mechanism 33 is provided at the innermost part of the reproducing apparatus 30 on the side opposite of an inserting opening 51, and comprises a pair of upper and lower holding fingers 52.

Upon reproduction of the disc 16, the disc case 10 is inserted through the inserting opening 51 of the reproducing apparatus 30, by inserting the disc case 10 with the side of the lid plate 12 in the direction of an arrow X1.

When the jacket opening enlarging mechanism 31 is pushed by the disc case 10 in the direction of the arrow X1, along guide rails 63 and 64, upper and lower enlarging members 61 and 62 respectively rotate in the directions of arrows A1 and B1, to lock and push the front part of the jacket halves 13a and 13b upwards and downwards so as to enlarge the opening 15. Accordingly, the jacket halves 13a and 13b are deformed as indicated by one-dot chain lines in FIG. 2, to enlarge the opening 15.

The disc case 10 is inserted into the innermost part of the reproducing apparatus 30, together with the enlarging mechanism 31, the case being over the upper side of the turntable 32, cutouts 27 of the lid plate 12 are locked by the lid plate locking mechanism 34. Hence, the lid plate 12 is locked and held at the innermost part of the reproducing apparatus 30.

Furthermore, engagement releasing members 54 enter inside the openings on the right and left sides of the disc case 10, and push sloping surfaces at the tip ends of the engaging arms 23 (FIG. 1). Accordingly, the engaging arms 23 are respectively distorted inwardly, and the projections 24 respectively pass out from the depressions (not shown), to release the engagement of the lid plate 12 from the jacket 11. Further, the disc 16 is held at a predetermined height by the holding fingers 52.

Next, the jacket 11 is pulled out, in the direction of an arrow X2 (FIG. 3). Since the lid plate 12 and the disc 16 are respectively locked and held as described above, only the jacket 11 is moved in the direction of the arrow X2, leaving behind the lid plate 12 and the disc 16. Accompanied by this pulling out operation of the jacket 11, the lid plate 12 and the disc 16 are pulled from within the jacket 11. When the jacket 11 is completely pulled from the reproducing apparatus 30, the disc 16 is supported horizontally at a position which is directly above the turntable 32.

Next, when an operation is performed to play back the disc, the disc 16 is lowered and placed onto the turntable 32, where it is clamped by a disc clamping mechanism 35. In addition, the disc 16 is rotated in a clockwise direction, together with the turntable 32.

Moreover, the carriage 47 moves in the direction of the arrow Y1, from a waiting position, to reproduce the information signal by the reproducing stylus 43 which scans the recorded surface of the disc 16.

In the above described disc loading operation, the lid plate 12 is locked by the lid plate locking mechanism 34. However, in a case where an erroneous operation is performed in which the disc 16 is not held by the disc holding mechanism 33, the jacket 11 is pulled outside the reproducing apparatus 30 while the disc 16 is still accommodated within the jacket 11.

When the jacket 11 is pulled out in the vicinity of the inserting opening 51, the enlarging members 61 and 62 respectively rotate in the directions of arrows A2 and B2, to separate from the jacket 11. Hence, the upper and lower jacket halves 13a and 13b of the deformed jacket 11 are returned to the original states, due to the flexibility of these jacket halves 13a and 13b. That is, the jacket halves 13a and 13b are restored to a parallel state, and the opening 15 returns to the original size from the enlarged state. Accordingly, in a state where the jacket 11 is pulled out from the reproducing apparatus 30, the corresponding columnar projecting parts 17a, 17b, 18a, and 18b respectively make contact with each other as shown in FIG. 2, to form the stopping beams 26a and 26b.

Therefore, even when the jacket 11 is handled in a manner in which the opening 15 of the jacket 11 faces downwardly, after pulling the jacket 11 out of the reproducing apparatus 30, the outer peripheral side edge of the disc 16 is stopped by the above stopping beams 26a and 26b. Thus, the disc 16 remains within the jacket 11 and does not slip out of the jacket, to positively protect the disc 16.

Moreover, when the jacket 11 accommodating the disc 16 therein is inserted into and then pulled out of the reproducing apparatus 30, the lid plate 12 positively engages with the jacket 11. Accordingly, the jacket 11 is pulled out from the reproducing apparatus 30 in a state where the lid plate 12 is engaged with the jacket 11 and the opening 15 of the jacket 11 is closed by the lid plate 12.

The above columnar projection parts 17a, 17b, 18a, and 18b are respectively provided at a center part of the opening 15 where the opening 15 is enlarged by the largest quantity. Further, the projecting lengths n of the columnar projecting parts are small. Therefore, in a state where the opening 15 of the jacket 11 is enlarged upwardly and downwardly, a distance q between the opposing columnar projecting parts becomes sufficiently large. Hence, the recording surface of the disc 16 is positively prevented from being scratched by the columnar projecting parts when the disc 16 enters and leaves the jacket 11, and the disc 16 is prevented from being damaged.

Generally, in a jacket which is formed from flat upper and lower jacket halves, there is a tendency for the jacket halves to deform in a concave direction, indicated by two-dot chain line in FIG. 2 to mutually close upon each other, due to deformation introduced upon moulding of the jacket halves. Hence, in this case, the width of the opening 15 of the jacket 11 becomes smaller. When the jacket 11 is deformed in the above described manner, the tip ends of the jacket halves do not become locked by fingers of the enlarging members 61 and 62, upon the insertion of the empty jacket 11 to recover the disc 16 previously left within the reproducing apparatus 30. Accordingly, the opening 15 of the jacket 11 cannot be enlarged, and it becomes impossible to recover the disc 16 from within the reproducing apparatus 30.

However, in the present embodiment of the invention, even when the jacket halves 13a and 13b are deformed, the columnar projecting parts 17a and 18a, and 17b and 18b respectively make contact with each other at the side of the opening 15 of the jacket 11, to limit the concave deformation of the jacket halves. Thus, the parts of the jacket halves 13a and 13b in the vicinity of the opening 15 are maintained in a linear and in mutually parallel states. Accordingly, the width of the opening 15 of the jacket 11 is maintained at a constant width w throughout the entire width of the opening 15. Therefore, when the jacket 11 is inserted into the reproducing apparatus 30, the tip ends of the jacket halves 13a and 13b are locked by the fingers of the enlarging members 61 and 62, to positively enlarge the opening 15, and the disc recovering operation can be performed in a normal manner.

Furthermore, during a disc reproducing mode, the empty jacket 11 is placed onto a table, for example, near the reproducing apparatus 30. However, there are cases when an object of considerable weight is placed on top of the empty jacket 11 and left there for a long period of time. In this case, the jacket could become deformed and the size of the opening is decreased as compared to the conventional jacket. However, in the jacket 11 of the present embodiment of the invention, the jacket 11 is prevented from becoming so deformed at the side of the opening 15 due to the operation of the above columnar projecting parts 17a, 18a, 17b, and 18b, and is maintained in the original state. In addition, when the empty jacket 11 is viewed from the side of the opening 15, the columnar projecting parts 17a and 18a, and 17b and 18b respectively make contact with each other at the opening 15 as shown in FIG. 2. Accordingly, the columnar projecting parts 17a, 18a, 17b, and 18b also have a function to prevent a foreign object from being inserted into the empty jacket 11.

Furthermore, the above columnar projecting parts 17a, 18a, 17b, and 18b also function so as to prevent the opening 15 of the jacket 11 from being excessively deformed in a case where the jacket 11 is handled in a manner in which the side of the opening 15 is grasped. Hence, even when the disc 16 is not properly held as described above, the jacket 11 is handled in a state where the lid plate 12 is left within the reproducing apparatus 30 and the disc 16 is accommodated within the jacket 11, the disc 16 is protected from being damaged since the opening 15 of the jacket 11 cannot be deformed excessively such that the jacket halves 13a and 13b are deformed inwards to make contact with the disc 16.

Figure 4:
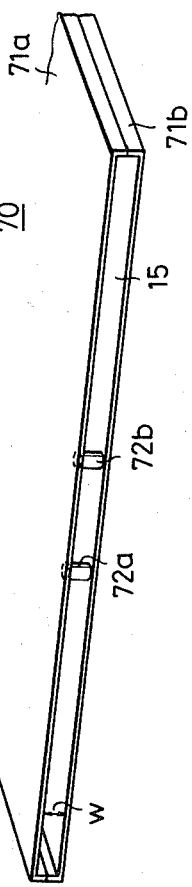
FIGS. 4 and 5 are perspective views, with a part cut away, respectively showing essential parts of a second and third embodiments of a case for a rotary recording medium according to the present invention.
Figure 5:
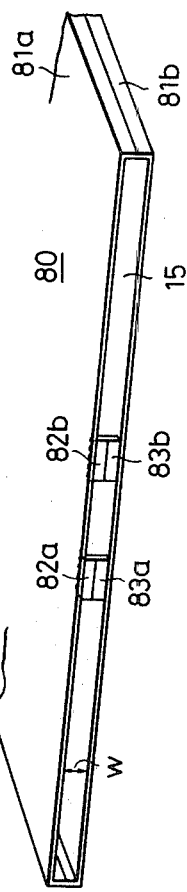

FIGS. 4 and 5 respectively show a jacket which forms an essential part of second and third embodiments of a case for a rotary recording medium according to the present invention. The lid plate 12 shown in FIG. 1 engages the above jackets shown in FIGS. 4 and 5.

A jacket 70 shown in FIG. 4 is assembled from a pair of jacket halves 71a and 71b. Columnar projecting parts 72a and 72b are respectively formed on the jacket halves 71a and 71b, at positions not opposing each other. The above columnar projecting parts 72a and 72b project for a distance corresponding to the width w of the opening 15 of the jacket, and make contact with the opposing jacket half.

A jacket 80 shown in FIG. 5 is assembled from a pair of jacket halves 81a and 81b. A pair of projecting ribs 82a and 82b are formed on the jacket half 81a, while a pair of projecting ribs 83a and 83b are formed on the jacket half 81b. These projecting ribs 82a and 83a, and 82b and 83b respectively make contact with each other at the opening 15 of the jacket.

The above described columnar projecting parts 71a and 72b of the jacket 70, and the projecting ribs 82a, 82b, 83a, and 83b of the jacket 80 respectively function in a similar manner as the columnar projecting parts 17a, 17b, 18a, 18b of the jacket 11. Accordingly, the disc 16 is prevented from slipping out of the jackets 70 and 80 if the disc 16 is not properly held within the reproducing apparatus and obtained outside the reproducing apparatus in a state accommodated with the jacket.

Moreover, the above projecting parts or ribs can be provided at one or three positions at the opening of the jacket.

Further, the present invention is not limited to these embodiments, but various variations and modifications may be made without departing from the scope of the invention.

What is claimed is:

1. A case for a rotary recording medium comprising:
a jacket having a space for accommodating a rotary recording medium and an elongated opening on one end of said jacket through which the rotary recording medium can enter and leave said jacket; and
a lid member for closing said opening of said jacket, said elongated opening being defined by longer sides and shorter sides,
said jacket having projecting parts crossing said elongated opening by extending between the longer sides of said elongated opening.

2. A case as claimed in claim 1 in which said jacket consists of a pair of jacket halves, and said projecting parts project from one jacket half towards the other jacket half.

3. A case as claimed in claim 1 in which said projecting parts are located in the vicinity of a center portion of the longitudinal direction of said opening.

4. A case as claimed in claim 1 in which said jacket comprises a pair of jacket halves, each of said jacket halves having a pair of projections extending from one of said jacket halves toward the other of said jacket halves, and tip ends of said pair of projections on a first of said jacket halves making contact with corresponding tip ends of the pair of projections extending from a second of said jacket halves.

5. A case as claimed in claim 4 in which projecting lengths of each of said projections from said jacket halves corresponds to one-half the shorter side of said elongated opening.

6. A case for a rotary recording medium comprising:
a jacket having a space for accommodating a rotary recording medium and an elongated opening on one end of said jacket through which the rotary recording medium can enter and leave said jacket; and
a lid member for closing said opening of said jacket, said elongated opening being defined by longer sides and shorter sides,
said jacket having projecting parts which are columnar projections crossing said elongated opening by extending between the longer sides of said elongated opening.

7. A case as claimed in claim 1 in which said projecting parts are ribs.

8. A case as claimed in claim 1 in which said lid member has holes which engage with said projecting parts in a state where said lid member closes said opening of said jacket.

* * * * *